May 5, 1953     F. S. LAPEYRE ET AL     2,637,065
SHRIMP CLEANER AND PEELER
Filed March 26, 1951     6 Sheets-Sheet 1
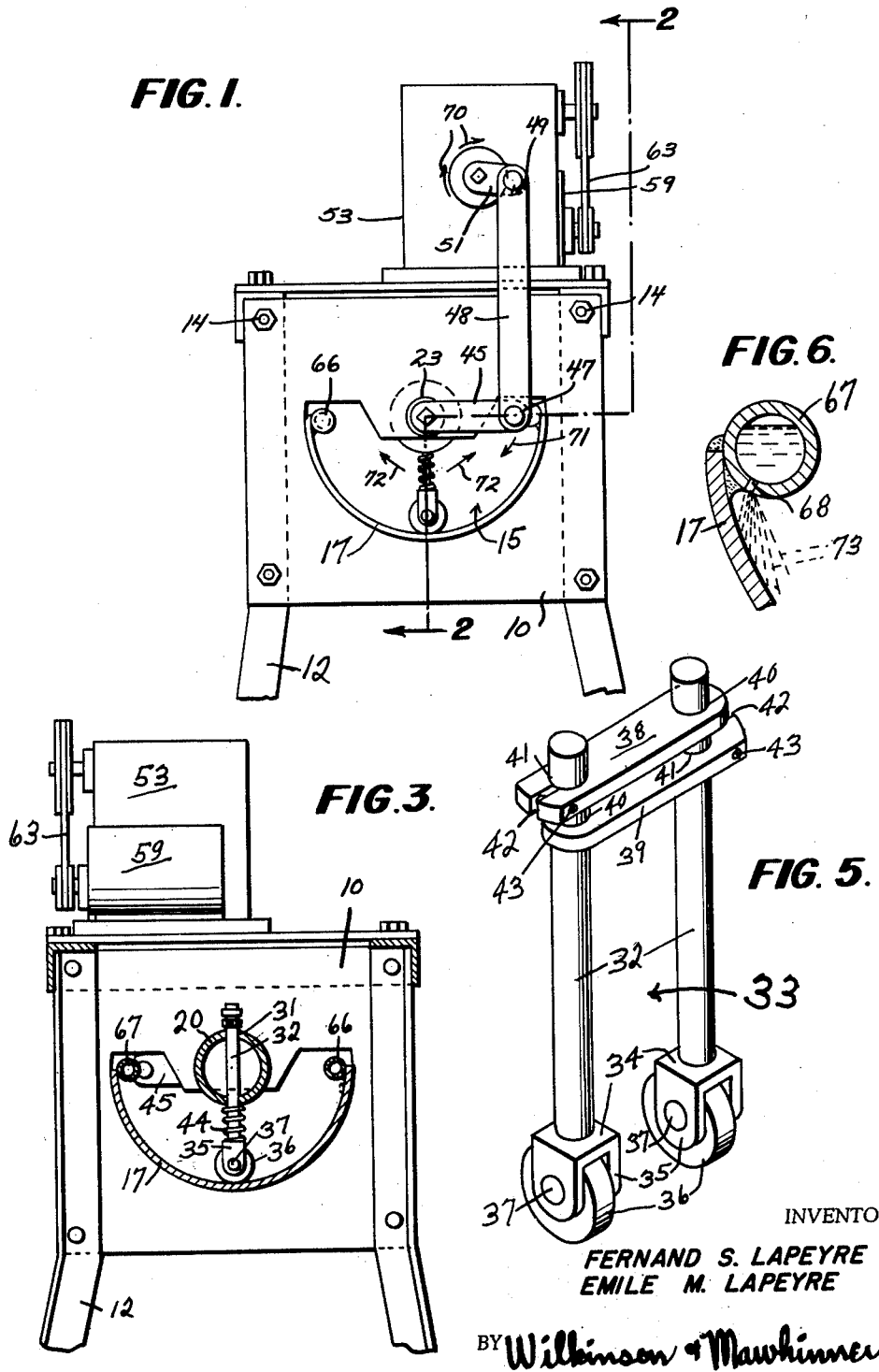
INVENTORS
FERNAND S. LAPEYRE
EMILE M. LAPEYRE
BY Wilkinson & Mawhinney
ATTORNEYS

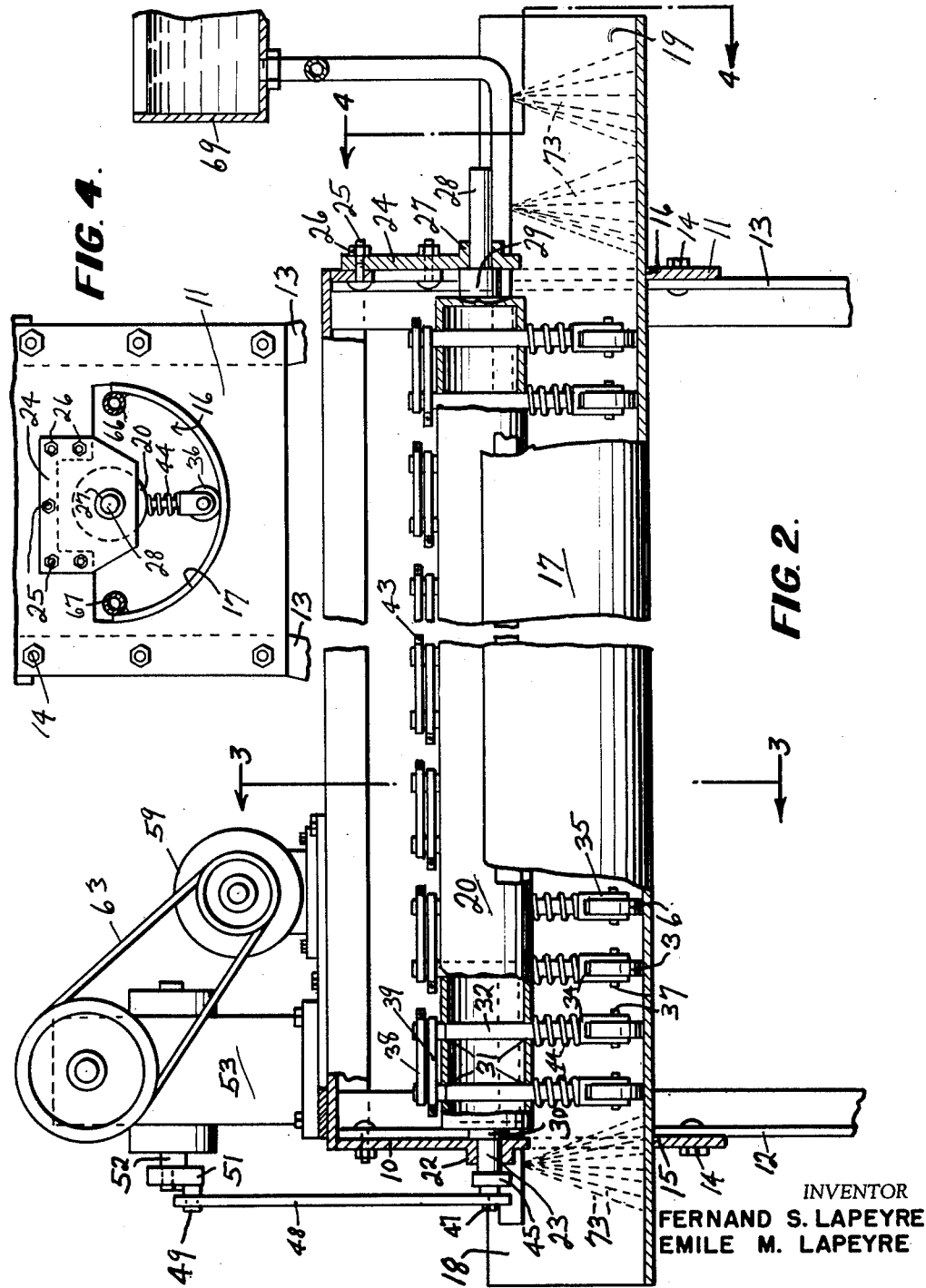

May 5, 1953   F. S. LAPEYRE ET AL   2,637,065
SHRIMP CLEANER AND PEELER
Filed March 26, 1951   6 Sheets-Sheet 3

INVENTORS
FERNAND S. LAPEYRE
EMILE M. LAPEYRE
BY Wilkinson & Mawhinney
ATTORNEYS

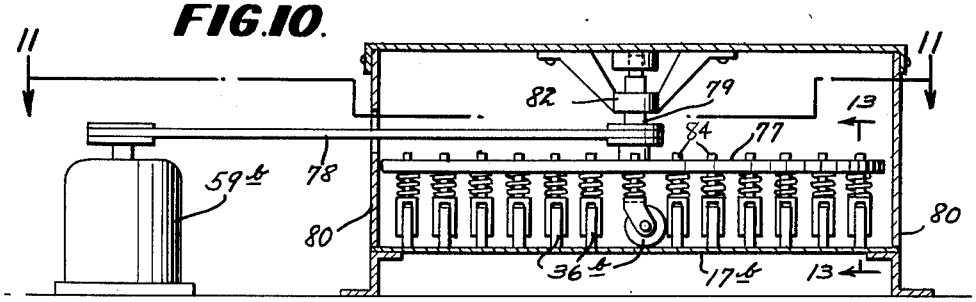
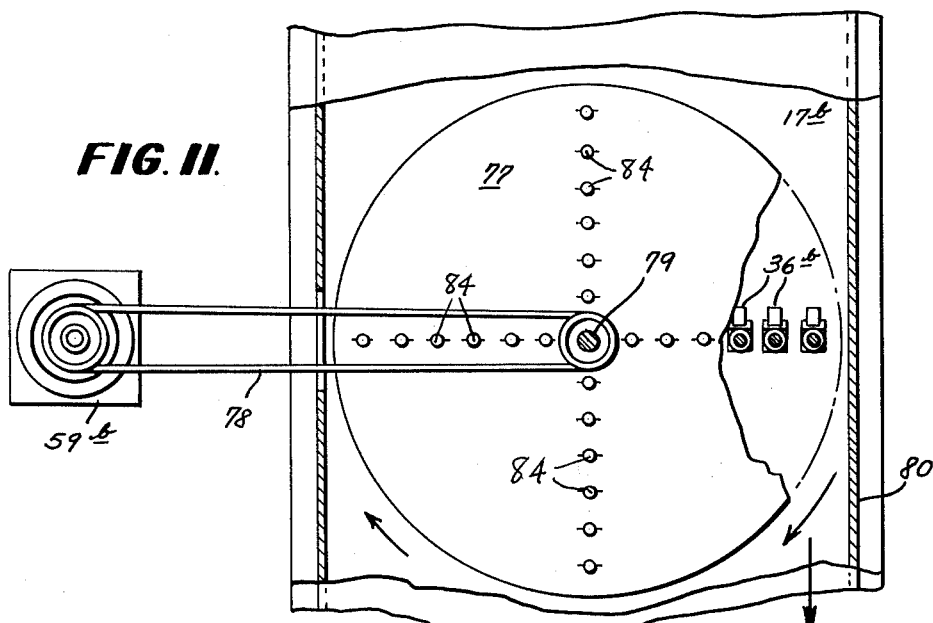
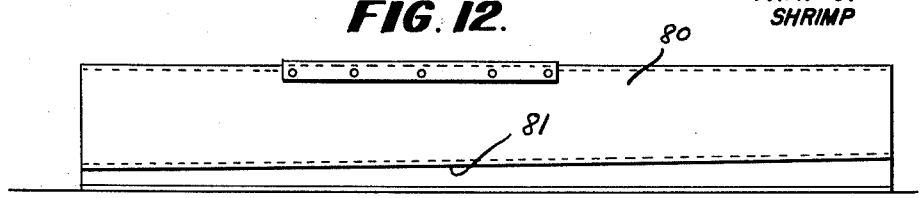
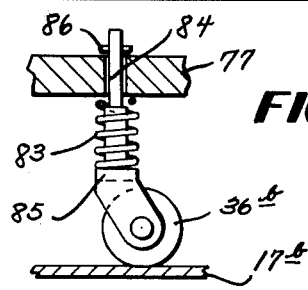

May 5, 1953     F. S. LAPEYRE ET AL     2,637,065
SHRIMP CLEANER AND PEELER
Filed March 26, 1951     6 Sheets-Sheet 5
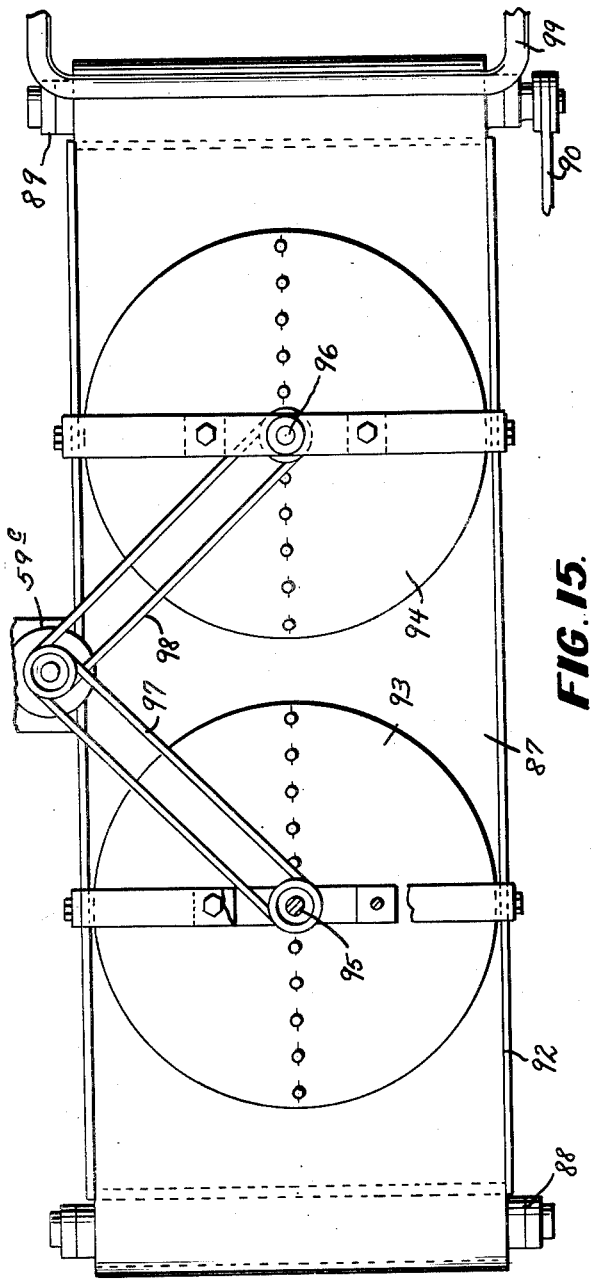
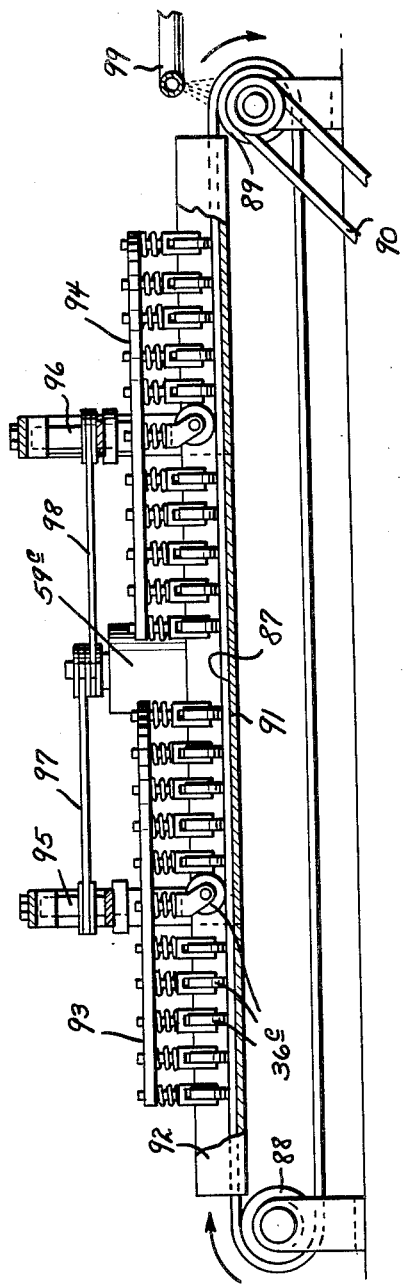
INVENTORS
FERNAND S. LAPEYRE
EMILE M. LAPEYRE
BY Wilkinson & Mawhinney
ATTORNEYS

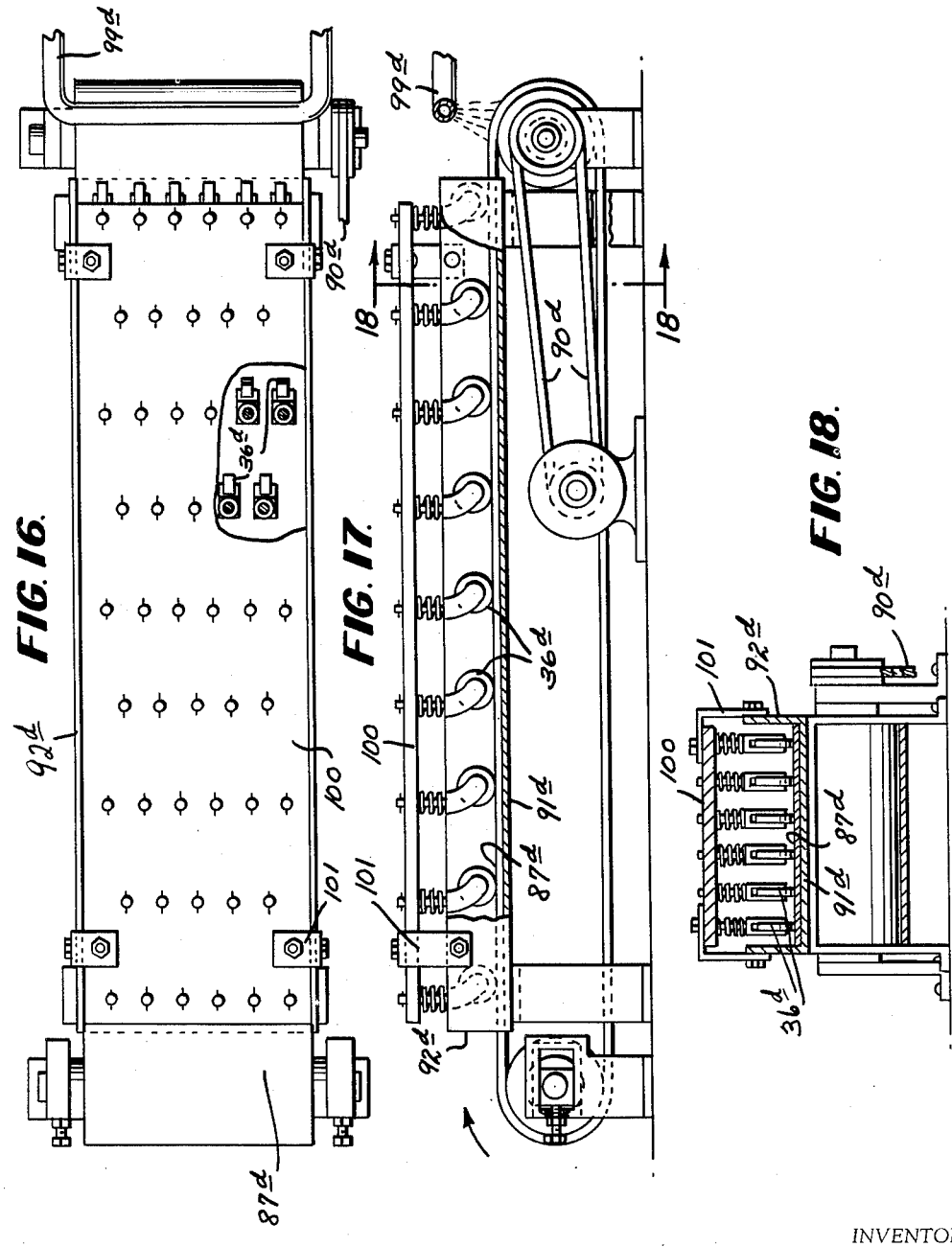

Patented May 5, 1953

2,637,065

UNITED STATES PATENT OFFICE 2,637,065

SHRIMP CLEANER AND PEELER

Fernand S. Lapeyre, New Orleans, and Emile M. Lapeyre, Houma, La., assignors, by mesne assignments, to The Peelers Company, Houma, La., a partnership Application March 26, 1951, Serial No. 217,468

30 Claims. (Cl. 17—2)

The present invention relates to improvements in a shrimp cleaner and peeler and has for an object to provide a machine of this kind through which shrimp already peeled, either mechanically or manually, may be passed to remove the remaining trash, such as portions of the shells, gristle and feet which may not have been removed in the initial peeling operation.

In shrimp cleaning and peeling machines as previously developed by applicants the shrimp emerge with certain trash still adhering and unremoved and it is the purpose of the present invention to pass such cleaned and peeled shrimp through a machine for the removal of the remaining trash in which one or more relatively narrow rollers are caused to encounter the shrimp and to pinch the same between the roller and a backing member or trough through which the shrimp are passed.

The rollers and the trough have relative movement, and certain forms of the invention show movable rollers and other forms show movable troughs.

It is a further object of the invention to provide a machine which will more effectively clean and peel the shrimp to increase the value of the meat as a more perfect commercial article.

It is a still further object of the invention to achieve the foregoing objects economically and simply by a machine that is inexpensive to construct and is positive and efficient in operation with a minimum of attendance by an operator of a relatively unskilled class.

With the foregoing and other objects in view, the invention will be hereinafter more fully described and more particularly pointed out in the appended claims.

In the drawings, in which the same parts are denoted by the same reference numerals throughout the several views, Figure 1 is a fragmentary end elevational view of an oscillatory roller form of device constructed in accordance with the present invention.

Figure 2 is an enlarged longitudinal sectional view taken on the line 2—2 of Figure 1 and looking in the direction of the arrows and with parts broken away.

Figure 3 is a transverse sectional view taken on the line 3—3 of Figure 2 and looking in the direction of the arrows.

Figure 4 is a transverse sectional view taken on the line 4—4 of Figure 2 and looking in the direction of the arrows.

Figure 5 is a perspective view of a form of roller unit employed.

Figure 6 is an enlarged fragmentary sectional view of one of the spray pipes and the adjacent portion of the trough.

Figure 10 is a longitudinal vertical section taken through another form of rotary roller machine.

Figure 11 is a horizontal section taken on the line 11—11 of Figure 10 with parts broken away.

Figure 12 is a side elevational view of a form of trough employed with an inclined bottom inclining to the discharge end of the machine.

Figure 13 is an enlarged vertical section of a detail of caster roller taken on the line 13—13 of Figure 10.

Figure 14 is a top plan view of a rotary roller-belt trough form of the machine.

Figure 15 is a side elevational view of the same with parts broken away and parts shown in section.

Figure 16 is a top plan view, with parts broken away, showing a further modified form of the invention showing stationarily mounted rollers in connection with an endless travelling trough belt.

Figure 17 is a side elevational view of the same with parts broken away and parts shown in section, and Figure 18 is a transverse vertical section taken on the line 18—18 in Figure 17.

Figure 7:
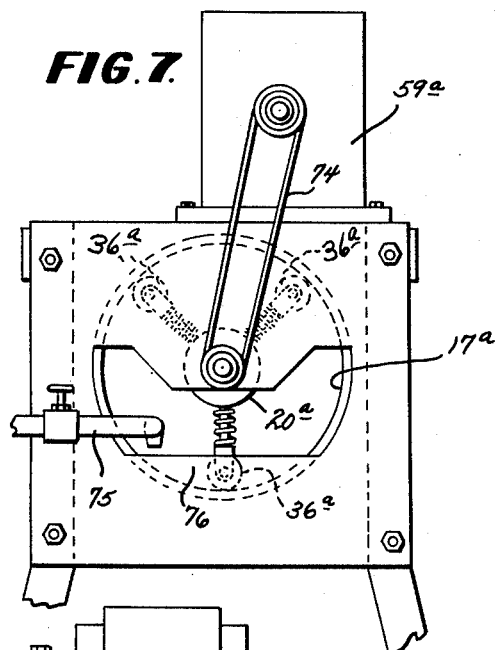
Figure 7 is an end elevational view of a rotary roller form of machine taken from the inlet end thereof.

Referring more particularly to the drawings, 10 and 11 indicate end plates which are supported at the opposite ends of the device by pairs of legs 12 and 13, respectively. The legs may be of angle iron formation in cross section and the plates may be secured to the outer end flanges of the legs by bolts 14 or the like. The lower portions of the legs of each pair of legs may diverge downwardly from one another to impart greater stability to the device.

The end plates 10 and 11 have cut away portions 15 and 16, respectively. A trough 17 which is arcuate in cross-section is supported by the end plates 10 and 11 and has its opposite end portions extending through the openings 15 and 16 to provide an inlet 18 and a discharge outlet 19 for the shrimp.

A shaft 20 which may be hollow extends longitudinally of the trough 17 and is journalled for oscillatory movement on an axis which substantially coincides with the axis of curvature of the trough 17. Trunnions 23 and 28 projecting from opposite ends of the hollow shaft 20 are journalled in bearings 22 and 27 in the end plate 10 and in a detachable plate 24 respectively; such detachable plate 24 being located at the discharge end of the machine and affixed to the rear end plate 11 by appropriate fastenings, such for instance as the bolts 25 and nuts 26. The plate 24 is made demountable for the purpose of installing and removing the shaft 20. If desired spacing collars 29 and 30 may be interposed between the ends of the shaft 20 and the adjacent portions of the plates 10 and 24 to compensate for end thrust of the shaft and to space the ends of the shaft from the plates 10 and 24 to minimize friction.

The shaft 20 has a plurality of longitudinally spaced apart pairs of openings 31. The openings 31 of each pair are disposed in substantially diametrical relation so that the openings of each pair are in registry and receive slidingly therethrough the post 32 of roller units generally indicated at 33. The lower ends of the posts 32 have forks 34, the arms 35 of which receive therethrough the pins 37 on which are journalled the rubber rollers or wheels 36. Springs 44 are interposed between the shaft 20 and the forks 34 for yieldably urging the rollers 36 against the inside curved surface of the trough 17 in which such rollers are oscillated as hereinafter described.

The upper ends of the posts 32 project above the shaft 20 and the pair of posts of each roller unit 33 are connected together and against rotation by appropriate devices, for instance as shown more particularly in Figure 5. In this figure plates 38 and 39 are shown. Openings 40 and 41 are made through these plates of a diameter very slightly in excess of the external diameter of the posts 32. Adjacent one opening 41 each plate is slit, at 42, the slit extending through the end of the plate. The two divided portions of the plate are connected together by clamp screws, bolts or other fastenings 43 which enable the plates 38 and 39 to be clamped tightly to the posts 32 about the openings 41. From Figures 2 and 5 it is made clear that the plates 38 and 39 are relatively reversed. In other words one of the plates is affixed to one of the posts 32 at 41 while the companion post of the pair is able to move up and down vertically in the plate through the opening 40. Thus each post carries a plate while the post slides through the other plate. The combination of the two plates 38 and 39 will thus prevent the posts 32 from rotating around their own axes and will compel the rollers 36 to tract substantially in true transverse lines back and forth across the curved trough 17.

A driven crank arm 45 has one end portion affixed to the trunnion 23 outwardly of the bearing 22. The outer end of the driven crank arm 45 is coupled, as by a pivot pin 47 to the lower end of a link 48. The upper end of such link 48 is coupled by a pivot pin 49 to a drive crank arm 51 fast on a shaft 52 of a speed reducer 53 which may be secured by bolts or other fastenings to the frame of the machine. The rotation of the short drive crank 51 will communicate through the link 48 an oscillating movement to the lower longer driven crank arm 45.

A variable speed electric motor 59 may be installed on the machine frame adjacent the speed reducer 53 and arranged to drive the speed reducer through a pulley and belt arrangement 63. Spray pipes 66 and 67 may be secured by welding or otherwise to the inner surface of the trough 17 adjacent the upper edges thereof. The pipes have a series of openings 68 in the lower portions thereof preferably toward the trough 17 and may extend the full length of the trough. As shown in Figure 2 the ends of the pipes may be connected to a suitable water or other liquid supply 69. The pipes 66 and 67 may or may not be used.

In operation, shrimp which have been previously peeled are introduced into the trough 17 at the inlet end 18. The shrimp may be introduced with a sufficient stream of water to carry the same downwardly through the trough in which case the use of the pipes 66 and 67 will be unnecessary; or the shrimp may be introduced without the water supply, in which event the necessary water may be furnished through the pipes 66 and 67 which will tend to move the shrimp through the trough. The trough may be inclined downwardly from the inlet end 18 to the outlet end 19 if desired to induce this movement of the shrimp therethrough. The electric motor 59 being energized will oscillate the shaft 20 through the connections previously described and will communicate a like movement to the various posts 32 and the rollers 36, causing such rollers to oscillate transversely of the curved trough 17 as indicated by the arrows 72 in Figure 1. The springs 44 will tend to maintain the rollers 36 in contact with the trough wall 17, and such springs 44 will be compressed as the rollers 36 encounter and ride up upon the shrimp, subjecting the shrimp to pressure and a pinching action in which the trash or other peel remaining after the first peeling are removed from the shrimp meat. As the shrimp pass through the trough they will tend to fall by gravity down the arcuate walls of the trough to the bottom thereof. Where the water sprays 73 are employed from the pipes 66 and 67, such water will impinge against the inner surface of the trough 17 at the upper edges thereof and will flow down the sides of the trough and will also tend to wash the shrimp down towards the bottom of the trough and into and beneath the rollers 36. The trough may be made of metal or may have its inner face lined with metal, so that when wet it will be slick to enhance the washing-down effect of the water.

As the shrimp pass longitudinally through the trough 17, the rollers 36 will move back and forth across the path of the shrimp and press the shrimp against the inner face of the trough to pinch the hulls, appendages, and other remaining trash from the meat. The edible meat of the shrimp will not be mutilated as it is of a slippery nature and the meat of the shrimp will slide away from the rollers 36 after the trash has been removed therefrom. This action will be augmented by the water supplied to the trough either with the shrimp or through the spray pipes 66, 67, and the inner face of the trough, where made slick, will also aid in this slipping-away action of the edible meat.

It will be noted that a plurality of spaced apart relatively narrow rollers are employed rather than wider rollers or one continuous roller because the relatively narrow roller is better able to reach into the natural curve of the shrimp and grasp the gristle and the appendages of the shrimp. The face width of the rollers may range from one-half inch to two inches or more. The diameter of the roller will be determined by the size of the shrimp to be cleaned and peeled and it has been found that the use of larger rollers will be more efficient on larger shrimp. The rollers are narrow with respect to the shrimp to grasp each shrimp and move upon each shrimp in individual fashion. The narrow rollers individually and locally deal with particular shrimp and are able to enter the low points and extract the meat therefrom. The narrowness of the rollers with respect to the trough can be appreciated from a consideration of Figure 2.

The speed of the oscillating motion of the rollers 36 may be varied by changing the speed of the variable electric motor 59 or by means of the speed reducer 53. The speed of the oscillating motion of the rollers may be varied from 20 to 200 cycles per minute. The arc of travel of the rollers 36 may be varied from thirty degrees to one hundred twenty degrees or more by the use of crank arms of different relative lengths.

The length of the trough may be approximately eight feet and the inlet and outlet extensions 18 and 19 may be approximately twelve inches in length. These dimensions are merely given as examples and it is to be understood that the trough and the extensions may be of any other desired lengths. There may be approximately thirty-six rollers 36 employed, but this number may be increased or decreased as found necessary under operating conditions. While it is preferred to use a plurality of rollers, only one roller may be used. The trough may be oscillated instead of the roller or rollers.

Although not necessary for the proper feeding of the shrimp through the trough 17, if desired, the trough may have a light fall of approximately two inches in six feet from the feeding end 18 towards the discharge end 19. The device may also be operated with the trough parallel to the floor or other supporting structure, by damming off the intake end of the trough. The water supply to the trough would accumulate and in seeking its own level would have a tendency to flow towards the open or discharge end of the trough carrying the shrimp along with it. The agitation of the water caused by the action of the moving rollers would also assist in the movement of the water and shrimp towards the discharge end.

The spray pipes 66 and 67 will keep the sides of the trough moist so that the shrimp will slide to the bottom of the trough. The edible meats and the trash will be discharged together through the open end of the discharge outlet 19 of the trough into a suitable container for separation later by any suitable means.

When it is desired to remove the shaft 20 and the roller assemblies for the purpose of cleaning, repairing or replacements, the motor 59 will be stopped and the supply of water to the pipes 66 and 67 will be shut off. The bolts 25 will be removed from the bearing plate 24 and the crank arm 45 will be detached from the trunnion 23 of the shaft 20. The shaft 20 and the roller assemblies 33 can then be withdrawn through the opening 10 in the end plate 11. Access can then be had to the interior of the trough 17. If desired to replace one of the roller assemblies 33 it is only necessary to remove plates 38 and 39 and the post 32 may be removed and a new assembly placed therein.

All dimensions herein given are by way of example only and serve to indicate one successful form only of the invention. One or more of the rollers 36 may be employed, and the trough and a roller together constitute a mechanical couple which when oscillated relatively act to pinch and peel the trash from the shrimp.

The shrimp are introduced at the receiving end of the trough together with sufficient water to wash the shrimp slowly along the trough toward the discharge end. The shrimp slide down the slick side surfaces of the trough, aided by the liquid sprays where the same are used, and are thus induced by gravity to enter the nips between the trough and the rollers.

Figure 8:
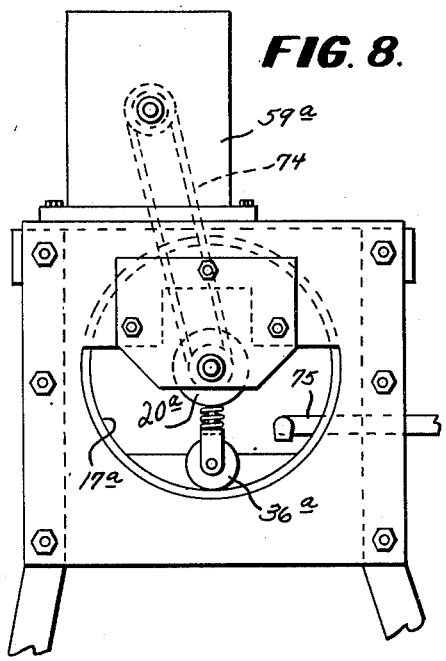
Figure 8 is a similar view taken from the outlet end of the machine.
Figure 9:
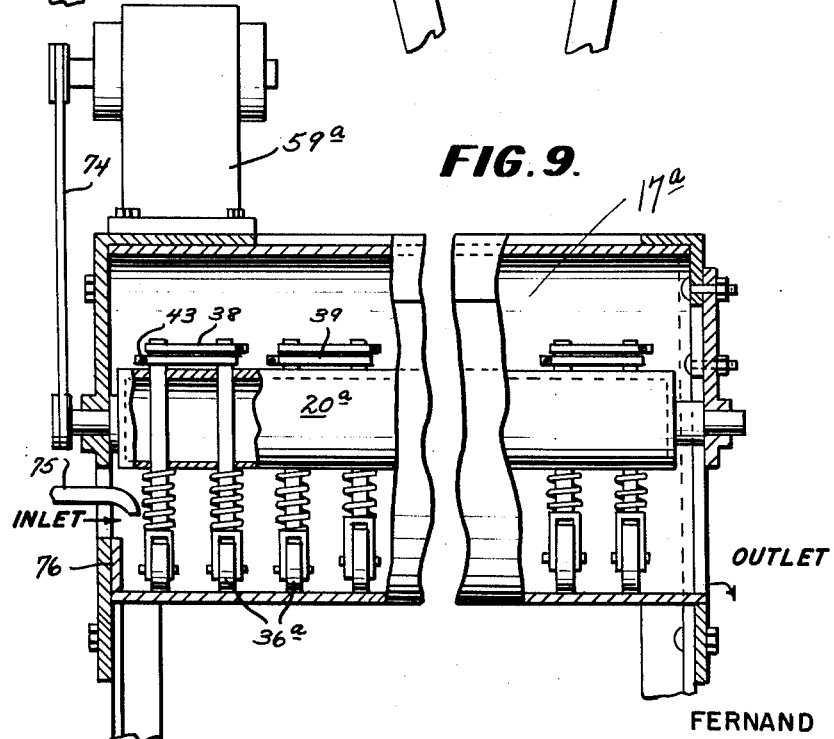
Figure 9 is an enlarged fragmentary longitudinal central section taken through the rotary roller form of the invention.

Referring more particularly to Figures 7, 8 and 9, a machine similar to that illustrated in Figures 1–6 is shown, differing therefrom in that the trough 17ª is tubular or cylindrical and the rollers 36ª and the shaft 20ª are mounted for complete rotary movement and do not oscillate. The oscillatory motion is thus eliminated and the drive shaft 20ª is connected to the motor unit 59ª by a belt and pulley drive 74. Obviously any other form of drive may be employed.

The shrimp are fed in at the inlet end where the water pipe 75 is arranged to discharge water inside a dam 76 erected at the inlet end of the trough. The casters 36ª are shown to be spring loaded. The tubular trough 17ª may be inclined downward to its outlet end. There may be more than one row of casters if desired as illustrated in Figure 7.

The shrimp is fed in the water and subjected to the pinching action of the rollers 36ª reacting with the tubular trough 17ª.

Each row of casters 36ª may be made up of casters of different size. The smallest size used may be located at the input end of the trough. The next size may be arranged in an adjoining position and the largest size at the discharge end. Such variations in casters or rollers will also apply to the form of invention shown in Figures 1–6. The rollers may be varied as to size in either diameter or width.

Referring more particularly to Figures 10 to 13 inclusive, the invention is shown embodied in connection with a flat trough 17ᵇ with the rollers individually spring loaded and a swivel type. Such rollers 36ᵇ are mounted in the form of a cross or otherwise on a disk frame 77 rotated from the motor 59ᵇ by the belt or other drive 78. The belt drive is applied to the disk frame shaft 79 which is mounted in appropriate thrust and guide bearings 82. There may be one roller assembly or two or more roller assemblies with the same rotating in the same or opposite directions. The bottom trough wall 81 may be inclined and included between the side walls 80. Each disk 77 may be mounted with one or more radial rows of swivel type casters 36ᵇ. The same or different disks may be mounted with different sized casters.

As shown in Figure 13 springs 83 may be coiled about the posts 84 between the disk frame 77 and the roller forks 85. If desired cotter pins 86 may be detachably inserted crosswise of the posts 84 above the disk 77.

Referring more particularly to Figures 14 and 15, the rollers or casters 36ᶜ are arranged in contact with an endless belt 87 serving as a trough. The belt runs about rollers 88 and 89 and is driven by a drive belt 90. The upper run of the belt 87 moves over a table 91 by which it is supported to insure its remaining flat under the pressure of the casters 36ᶜ. Side walls 92 of the table project upwardly above the plane of the upper run of the belt 87.

The rollers 36ᶜ are carried in two groups by disk frames 93 and 94, the shafts 95 and 96 of which are driven by the belt or other drives 97 and 98 from the motor 59ᶜ. Water may be supplied by a pipe 99 near the discharge end. The disks 93 and 94 may be rotated in the same or in opposite directions. Different disks may mount casters of different sizes.

In operation the belt 87 rotates in the direction of the arrows of Figure 15. The shrimp are fed in at the left end of the device and are subjected to the action of the great number of rollers which catch the shrimp between such rollers and the table supported belt for the purpose of pinching the remaining trash therefrom. The swivel action of the casters aids in accommodating the casters to the different contours of the shrimp in order to more effectually peel off the waste. The water line 99 provides a water spray to wash the shrimp from the belt at the shrimp output end.

Referring more particularly to Figures 16–18 the rollers 36ᵈ press upon an endless belt 87ᵈ supported by a table 91ᵈ having the side guards 92ᵈ. The belt 87ᵈ is driven by a belt drive 90ᵈ in the direction indicated by the arrow. The shrimp are washed from the belt at the output end by water from a water supply pipe 99ᵈ.

The rollers or casters 36ᵈ are mounted in a fixed frame 100 supported in any suitable manner, as for instance by the angle supports 101 from the side guards or walls 92ᵈ.

It will be noted from Figure 16 that the rollers 36ᵈ are mounted in transverse rows with the rollers of one row staggered with respect to those of adjacent rows so that the roller of one row are in line with the spaces between the rollers of adjacent rows and consequently it is impossible for the shrimp moving along the belt 87ᵈ to escape contact with a number of the rollers 36ᵈ. The rollers are individually spring loaded. A feature of this arrangement is that casters of various sizes may be incorporated so as to afford a more varied attack upon the various sized shrimp which might be introduced into the machine.

We have found it advantageous, in connection with the machine illustrated in Figures 1–6, to employ three different sizes of casters, 3, 4, and 5 inches in diameter, respectively. The three-inch caster is used for the first third of the trough located at the input; the four-inch size for the middle third; and the five-inch size for the last third to the discharge end of the trough. This arrangement of multiple caster sizes may be used in connection with the form of invention shown in Figures 7–9 and also in the forms of invention shown in Figures 10–13 and 14, 15. In the disk forms shown in Figures 10–15, the smallest sized caster is preferably used in the disk assembly under which the shrimp are first constrained to travel, while the larger size is carried by the disk under which the shrimp last passes. The advantage in such arrangement is that the smaller caster first contacts the shrimp and removes the appendages and the hull that remains on the shrimp with a minimum of mutilation to the meat. The larger of the casters would then, by virtue of the increased size, attack the more difficult gristle to be found under the head meat on the shrimp. The larger casters, if used throughout, would in the removal of the apendages and shell, be more apt to mutilate the meat. However, once the meats are fully cleaned, the larger caster has little or no mutilating effect.

The invention is realized by the action of a comparatively narrow roller against a surface upon which the almost wholly peeled shrimp are placed. A comparatively narrow roller is necessary to the function of the device because such a roller is able to reach into the natural curvature of a shrimp in order to come into contact with the feet, gristle and other appendages protruding from the underside of the shrimp. The narrowness of the roller has other advantages, for instance pertaining to the efficiency of the device. For example, the narrower the roller, the greater the number of rollers which can be used in a given area, thus giving a more varying attack upon the shrimp to be cleaned. Furthermore, the narrowness of the roller is of importance in that there is a tendency for a roller to carry the shrimp up along the curved sides of the trough to the highest point of the stroke of the roller and, as the roller assumes its downward stroke, the shrimp has a tendency to fall forwards on the other side of the roller by which the appendages of the shrip are attacked from a different angle. Such an action would be impossible if the thickness of the roller was too great.

In the claims the words "relatively narrow" characterize the width of the rollers with reference to the shrimp. A wide roller would engage only the highest point on the largest shrimp encountered; whereas narrower rollers individually and locally deal with particular shrimp and are enabled to enter the low points and extract the meat therefrom.

In the appended claims, the term "means forming a shrimp-receiving surface" is generic to all of the various forms of troughs, shown in the different embodiments of this invention. Thus, this term covers the true trough of Figures 1–6, the cylinder of Figures 7–9 and the cylinder of Figures 10–11 and the moving conveyor of Figures 14–15 and Figures 16–18. The means is to be construed as such and is qualified by the phrase "forming a shrimp-receiving surface." Each of the embodiments of the invention has a shrimp receiver or receiving means, which forms a shrimp-receiving surface with which the rollers cooperate in pressing the shrimp thereagainst.

By the word "trough" in the claims is meant any vessel, vat, channel, or container, either open or closed, regardless of cross-sectional shape. This word "trough" is intended to cover the open semi-cylindrical chamber 17 in Figures 1–6, the full complete cylinder 17ᵃ of Figures 7–9, the channel 17ᵇ of Figures 10–13, the belt 87, and side flanges 92 in combination with the table 91 of Figures 14 and 15, and the belt 87ᵈ, the flanges or side walls 92ᵈ combined with the table 91ᵈ of Figures 16 to 18.

The rollers form nips with the surfaces over which they roll. For instance, the rollers 36 in Figures 1–6 form, with the trough wall, nips for pinching the shrimp against the wall which is smooth, continuous or substantially imperforate. As a matter of fact each roller presents two nips at opposite sides thereof so that when the roller is travelling in either direction the shrimp is caught in the nips and subjected to the pinching action. In the case where, as in Figures 7–15 inclusive, the rollers revolve in a motion of translation the active nips are only at the leading edges of the revolving rollers but such nips have a continuous action upon the shrimp presented to the same.

In the case of Figures 1–6 where the rollers bodily oscillate back and forth transversely of the smooth trough wall 17, the nips at opposite sides of the rollers 36 are alternately brought into play but the action is substantially continuous throughout the bodily oscillating movement of the rollers.

In the case of Figures 16-18 the active nips are only at the left ends of the rollers, viewed in Figure 17, owing to the fact that the upper run of the conveyor 87d is moving in the direction of the arrow and thus urging the shrimp against one nip of the rollers only.

It is obvious that various changes and modifications may be made in the details of construction and design of the above specifically described embodiment of this invention without departing from the spirit thereof, such changes and modifications being restricted only by the scope of the following claims.

What we claim is:

1. In a shrimp cleaner and peeler, a trough having a rigid smooth wall along which shrimp are adapted to be moved, a series of spaced relatively narrow rollers movably engaging the wall to press shrimp against the wall, and means associated with the rollers and the trough for imparting relative movement to said wall and the rollers so that the shrimp are pinched against the wall by the rollers to remove trash therefrom.

2. In a shrimp cleaner and peeler, a trough having a rigid smooth wall along which shrimp are adapted to be moved, a series of spaced relatively narrow rollers in the trough, means mounting the rollers adjacent the wall in positions to press shrimp against the wall, and means associated with the mounting means and the trough for imparting relative movement to said wall and the rollers so that the shrimp are pressed against the wall in successive fashion by the rollers and trash is pinched off the meats with meats sliding away from the rollers on the smooth wall.

3. A shrimp cleaner and peeler comprising a means forming a shrimp-receiving surface along which shrimp are adapted to be moved and having an inlet and an outlet, a series of relatively narrow roller, means arranged in spaced relation from the inlet to the outlet, said rollers being disposed opposite the surface in such relation thereto that shrimp may be successively caught and held against the surface by the rollers while the rollers ride up on the shrimp to pinch the meat from the trash, and means associated with the means forming a shrimp-receiving surface and the rollers for imparting relative movement between the rollers and the surface.

4. A shrimp cleaner and peeler as claimed in claim 3, wherein said rollers rotate about axes substantially parallel to the path of movement of the shrimp.

5. In a shrimp peeler and cleaner, a trough having a rigid smooth wall adapted to support shrimp, a relatively narrow roller in the trough and movably engaged therewith, a supporting means for the roller, means for oscillating the supporting means to impart an oscillatory motion to the roller, said roller moving on the wall to provide a continuous to and fro nip in cooperation with the wall, whereby the shrimp caught in the nip have their non-edible parts pinched from the meats.

6. A shrimp peeler and cleaner comprising a trough having a rigid smooth, continuous wall along which shrimp are adapted to be moved, a plurality of relatively narrow rollers disposed in spaced relation in said passageway and rotatable in rotary planes substantially transverse to said passageway to define with the wall longitudinally spaced nipping zones, said rollers being disposed opposite said wall in such relation that shrimp are successively caught and held against the wall by the rollers while the rollers ride up on the shrimp to pinch the meat from the trash, and means for moving the rollers over the wall.

7. A shrimp cleaner and peeler having a supporting frame and including means forming a shrimp-receiving surface, a relatively narrow roller in contacting engagement with said surface, supporting means for said roller associated with said frame and retaining said roller in such relation to the surface that shrimp may be caught and held against said surface by said roller while the roller rides upon the shrimp to pinch the meat from the trash, and means associated with said roller supporting means and with said means forming a shrimp-receiving surface for imparting relative movement between the roller and the surface.

8. A shrimp cleaner and peeler as claimed in claim 7, wherein said rollers are spring urged into engagement with the surface.

9. A shrimp cleaner and peeler as claimed in claim 7, wherein said surface includes a rigid smooth, continuous wall along which the shrimp are adapted to move.

10. A shrimp cleaner and peeler as claimed in claim 7, wherein means is associated with the means forming a shrimp-receiving surface for supplying liquid to the surface.

11. A shrimp cleaner and peeler as claimed in claim 7, wherein said surface has an inlet end and an outlet end and is inclined downwardly from the inlet end to the outlet end.

12. A shrimp cleaner and peeler as claimed in claim 7, wherein said roller is retained by its supporting means for bodily movement toward and from the surface.

13. A shrimp cleaner and peeler as claimed in claim 7, wherein said roller supporting means includes a post and means is associated therewith to prevent rotation of the post.

14. A shrimp cleaner and peeler as claimed in claim 7, wherein the roller is spring loaded and swivelly mounted in the supporting means.

15. A shrimp cleaner and peeler as claimed in claim 7, wherein the surface is transversely curved and said last means includes means associated with the roller for oscillating the rollers transversely of the surface.

16. A shrimp cleaner and peeler as claimed in claim 7, wherein the surface is cylindrical and said last means includes means associated with the roller for revolving the roller around the surface.

17. A shrimp cleaner and peeler as claimed in claim 7, wherein the surface is flat and said roller supporting means includes a carrier rotatable in a plane substantially parallel with the surface.

18. A shrimp cleaner and peeler as claimed in claim 7, wherein said surface is movable and said roller supporting means has means associated therewith for retaining said roller against a motion of translation while the rollers rotate from engagement with the moving surface.

19. A shrimp cleaner and peeler as claimed in claim 7, wherein said surface is flat and movable and said roller supporting means has means associated therewith for retaining said roller against a motion of translation while the roller rotates from engagement with the moving surface.

20. A shrimp cleaner and peeler having a supporting frame and including means forming a shrimp-receiving surface having an inlet and an outlet, a series of relatively narrow rollers in contacting engagement with said surface and spaced from the inlet to the outlet, supporting means for said rollers associated with the frame and retaining said rollers in such relation to the surface that shrimp may be caught and held in successive fashion against the surface while the rollers ride upon the shrimp to pinch the meat from the trash and means associated with said supporting means for the rollers and with the means forming a shrimp-receiving surface for imparting relative movement between the rollers and the surface.

21. A shrimp cleaner and peeler as claimed in claim 20, wherein said means forming a surface includes a transversely curved trough and said surface includes the transversely curved inner wall of the trough and said supporting means includes an oscillatory member mounted longitudinally of the trough and from which the rollers depend.

22. A shrimp cleaner and peeler as claimed in claim 20, wherein said rollers are spring urged into engagement with the wall.

23. A shrimp cleaner and peeler as claimed in claim 20, wherein said rollers are attached by posts to said supporting means and are rotatable in rotary planes substantially transverse to said wall to define therewith longitudinally spaced nipping zones and means is associated with the posts to prevent rotation thereof.

24. A shrimp cleaner and peeler as claimed in claim 20, wherein said means forming a shrimp-receiving surface includes a cylinder and said last means includes means associated with the rollers for revolving the rollers around the inside of the cylinder wall.

25. A shrimp cleaner and peeler as claimed in claim 24, wherein the cylinder has an inlet end and an outlet end and is inclined from its inlet end to its outlet end.

26. A shrimp cleaner and peeler as claimed in claim 20, wherein said shrimp-receiving surface is flat and said last means includes means associated with the rollers for revolving the rollers in contact with the flat surface.

27. A shrimp cleaner and peeler as claimed in claim 20, wherein said shrimp-receiving surface is flat and said supporting means for the rollers includes a carrier member rotatable in a plane substantially parallel with the flat surface and said rollers are swivelly carried by the carrier member.

28. A shrimp cleaner and peeler as claimed in claim 20, wherein said means forming a shrimp-receiving surface includes a movable conveyor, a rigid backing wall for the conveyor, said rollers revolving and rotating in contact with the conveyor and shrimp thereon.

29. A shrimp cleaner and peeler as claimed in claim 20, wherein said means forming a shrimp receiving surface includes a movable conveyor and said supporting means for the rollers has means associated therewith retaining the rollers from a motion of translation while permitting of the rotation of the rollers from movement derived by contact with the moving conveyor.

30. A shrimp cleaner and peeler as claimed in claim 29, wherein said rollers are spring loaded and swivelly mounted in the supporting means.

FERNAND S. LAPEYRE.
EMILE M. LAPEYRE.

References Cited in the file of this patent

UNITED STATES PATENTS

| Number | Name | Date |
|---|---|---|
| 1,362,252 | Kennedy | Dec. 14, 1920 |
| 1,493,425 | Bergeron et al. | May 6, 1924 |
| 2,537,355 | Lapeyre et al. | Jan. 9, 1951 |

FOREIGN PATENTS

| Number | Country | Date |
|---|---|---|
| 142,160 | Germany | June 27, 1903 |
| 366,185 | Germany | Dec. 30, 1922 |
| 551,459 | France | Jan. 9, 1923 |
| 667,699 | France | June 24, 1929 |